(12) United States Patent
Moran et al.

(10) Patent No.: US 12,397,506 B2
(45) Date of Patent: Aug. 26, 2025

(54) DIAGNOSTICS AND RESOLUTION OPTIMIZATION FOR SCANNING PROJECTION STEREOLITHOGRAPHY

(71) Applicant: Lawrence Livermore National Security, LLC, Livermore, CA (US)

(72) Inventors: Bryan D. Moran, Pleasanton, CA (US); Brian J. Bauman, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/729,140

(22) Filed: Apr. 26, 2022

(65) Prior Publication Data

US 2022/0339877 A1    Oct. 27, 2022

Related U.S. Application Data

(60) Provisional application No. 63/179,761, filed on Apr. 26, 2021.

(51) Int. Cl.
*B29C 64/386* (2017.01)
*B29C 64/135* (2017.01)
(Continued)

(52) U.S. Cl.
CPC .......... *B29C 64/386* (2017.08); *B29C 64/135* (2017.08); *B29C 64/268* (2017.08);
(Continued)

(58) Field of Classification Search
CPC ..... B29C 64/386; B29C 64/268; B33Y 30/00; B33Y 10/00; B33Y 50/00
See application file for complete search history.

(56) References Cited

U.S. PATENT DOCUMENTS 7,227,618 B1 *  6/2007  Bi .......................... B33Y 30/00
                                                     355/71
2011/0001950 A1 *  1/2011  DeVoe ............... G03F 7/70525
                                                     355/67
(Continued)

FOREIGN PATENT DOCUMENTS

KR    10-2009-0044631 A     5/2009
KR    10-2010-0130497 A    12/2010
(Continued)

OTHER PUBLICATIONS

International Search Report and Written Opinion regarding Patent Application No. PCT/US2022/026373, dated Aug. 4, 2022.
(Continued)

*Primary Examiner* — Susan D Leong
*Assistant Examiner* — Xinwen Ye
(74) *Attorney, Agent, or Firm* — HARNESS, DICKEY & PIERCE, P.L.C.

(57) ABSTRACT

The present disclosure relates to a system for performing scanning projection stereolithography. The system uses a light projector which is configured to generate a polymerizing optical signal to initiate polymerization of a photopolymerizable resin or material at a build plane. An optics subsystem collimates and focuses the polymerizing optical signal. The optics subsystem is movable relative to the build plane to optimize focus of the polymerizing optical signal at the build plane. A light scanning subsystem directs the polymerizing optical signal received from the optics subsystem to selected X axis and Y axis locations on the build plane. A positioning subsystem positions the optics subsystem at a selected location relative to the build plane, where the selected location is chosen to optimize focusing of the polymerizing optical signal at a specific, selected X/Y location on the build plane.

21 Claims, 2 Drawing Sheets

(51) Int. Cl.
*B29C 64/268* (2017.01)
*B33Y 10/00* (2015.01)
*B33Y 30/00* (2015.01)
*B33Y 50/00* (2015.01)

(52) U.S. Cl.
CPC .............. *B33Y 10/00* (2014.12); *B33Y 30/00* (2014.12); *B33Y 50/00* (2014.12)

(56) References Cited

U.S. PATENT DOCUMENTS

| | | | |
|---|---|---|---|
| 2012/0228802 A1* | 9/2012 | Kan | B29C 64/135 264/401 |
| 2016/0368210 A1 | 12/2016 | Chen et al. | |
| 2017/0087766 A1 | 3/2017 | Chung et al. | |
| 2018/0345580 A1 | 12/2018 | Chen et al. | |
| 2019/0126537 A1 | 5/2019 | Saha et al. | |
| 2021/0001540 A1* | 1/2021 | Saha | B29C 64/268 |
| 2022/0227051 A1* | 7/2022 | Regehly | B29C 64/282 |

FOREIGN PATENT DOCUMENTS

| | | |
|---|---|---|
| WO | 2014074954 A2 | 5/2014 |
| WO | WO-2019173000 A1 * | 9/2019 |

OTHER PUBLICATIONS

Supplementary Partial European Search Report and Written Opinion, European Patent Application No. EP 22 79 652 dated Oct. 9, 2024, 16 pages.

\* cited by examiner

DIAGNOSTICS AND RESOLUTION OPTIMIZATION FOR SCANNING PROJECTION STEREOLITHOGRAPHY

CROSS-REFERENCE TO RELATED APPLICATIONS

This application claims the benefit of U.S. Provisional Application No. 63/179,761 filed on Apr. 26, 2021. The disclosure of the above application is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to scanning projection stereolithography systems and methods, and more particularly to a scanning projection stereolithography system and method which makes use of a controllably positionable optical element to eliminate or reduce the need for a flat image plane at the build plane, and which thus is able to provide significantly improved focusing accuracy at the build plane.

BACKGROUND

The statements in this section merely provide background information related to the present disclosure and may not constitute prior art.

When performing scanning projection stereolithography, achieving the best focus, highest resolution and smallest spot size are of primary importance. The stereolithographic system can only print features as small as the optical system can be focused. There are other techniques to affect spot size, but they are secondary to the primary metric of the resolution of the image of the digital micromirror device ("DMD") or other spatial light modulator ("SLM") at the build plane. Therefore, as with any LAPuSL (Large Area Projection Micro-Stereo Lithography) based stereolithographic system which directs an image of the SLM over a build area, having the best resolution image of the SLM over the build area is of the utmost importance.

The portion of the LAPuSL optical system that focuses the light onto the build plane is typically done by, but not limited to, using a flat field, or F-theta lens after the scanning mirrors. The goal of the f-theta lens is to both achieve a flat image plane and to compensate for the distortion that occurs when light is directed with a significant angle off axis through a lens. However, this is impossible to do perfectly. In particular, compromises in image quality are made because the design goal has been to design the f-theta lens to have an extremely flat in-focus field.

Accordingly, there remains a significant need in the art for a system and method which is able to eliminate or reduce the need for a flat image plane at the build plane when using a scanning projection stereolithography system.

SUMMARY

This section provides a general summary of the disclosure, and is not a comprehensive disclosure of its full scope or all of its features.

In one aspect the present disclosure relates to a system for performing scanning projection stereolithography. The system may comprise a light projector configured to generate a polymerizing optical signal to initiate polymerization of a photopolymerizable resin or material at a build plane. An optics subsystem may be included for collimating and focusing the polymerizing optical signal. The optics subsystem is movable relative to the build plane to optimize focus of the polymerizing optical signal at the build plane. A light scanning subsystem may be included which is configured to direct the polymerizing optical signal received from the optics subsystem to selected X axis and Y axis locations on the build plane. A positioning subsystem may be included for positioning the optics subsystem at a selected location relative to the build plane, where the selected location is chosen to optimize focusing of the polymerizing optical signal at a specific, selected X/Y location on the build plane.

In another aspect the present disclosure relates to a system for performing scanning projection stereolithography. The system may comprise a light projector configured to generate a polymerizing optical signal to initiate polymerization of a photoresist material at a build plane. A collimator may be included for collimating the polymerizing optical signal and a focusing lens system may be included for focusing the polymerizing optical signal. At least one of the collimator or the focusing lens system is adjustable by movement along an axis relative to the build plane to optimize focus of the polymerizing optical signal at the build plane. A light scanning subsystem may be included which is configured to direct the polymerizing optical signal received from the collimator and the focusing lens system to selected X axis and Y axis locations on the build plane. A focusing lens may be included which is disposed downstream of the light scanning subsystem and upstream of the build plane, relative to a direction of travel of the polymerizing optical signal from the light projector, for focusing the polymerizing optical signal at a selected X axis and Y axis location on the build plane. A positioning subsystem may be included for positioning at least one of the collimator or the focusing lens at a selected location along the Z axis, where the selected location is chosen to optimize focusing of the polymerizing optical signal at the specific, selected X axis and Y axis location on the build plane. A diagnostics subsystem may be included which makes use of a camera for imaging a portion of the polymerizing optical signal reflected from the build plane to view polymerization occurring at the build plane while forming a part.

In still another aspect the present disclosure relates to a method for performing scanning projection stereolithography. The method may comprise projecting a polymerizing optical signal toward a build plane, wherein the polymerizing optical signal is able to initiate polymerization of a photopolymerizable resin or material located at the build plane. The method may further comprise scanning the polymerizing optical signal to selected X axis and Y axis locations on the build plane. The method may further comprise collimating and focusing the polymerizing optical signal prior to the polymerizing optical signal reaching the light scanning subsystem. The method may further comprise adjusting a position of the optics subsystem before the polymerizing optical signal reaches the light scanning subsystem, and optimizing a focus of the polymerizing optical signal when the polymerizing optical signal reaches a specific X axis and Y axis location on the build plane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which.

DETAILED DESCRIPTION

Example embodiments will now be described more fully with reference to the accompanying drawings.

The present disclosure relates to a system and method where the focus changes required with scan angle in a scanning projection stereolithography system are accommodated in one embodiment by dynamically mechanically adjusting a position of an optical component during a build phase of operation, where the optical component in one embodiment is a collimator lens. This enables one to control where the best image occurs. This significantly reduces the need for a very "flat" field from the optical system, and in turn removes one of the major, challenging "tasks" from the optical system, namely, to provide a corrected focus plane.

The focus at various positions in the build plane may be mechanically adjusted, and in some embodiments dynamically mechanically adjusted. For example, the focus adjustment may be performed by electromechanical actuation, or by electrically tunable lenses (e.g., ETL liquid lenses), or by pneumatic actuators, or electrooptically, or even possibly by a combination of two or more of the above-mentioned techniques, or by any other method suited to the adjustment of optical components. By using one or more of the above-mentioned techniques, the optical design can be constructed to more heavily prioritize improvement of resolution. Using this system and method, namely mechanical compensation (either dynamic or static) of focus with an optical system optimized to use this mechanical focus adjustment, the resolution of the entire build plane can be significantly improved as compared to a system that does not have active (i.e., real time) adjustment. The present system and method are therefore different from any other active control system, as the present system and method involves imaging an object (e.g., the SLM) over a scanned field and compensating to achieve highest resolution.

Figure 1:
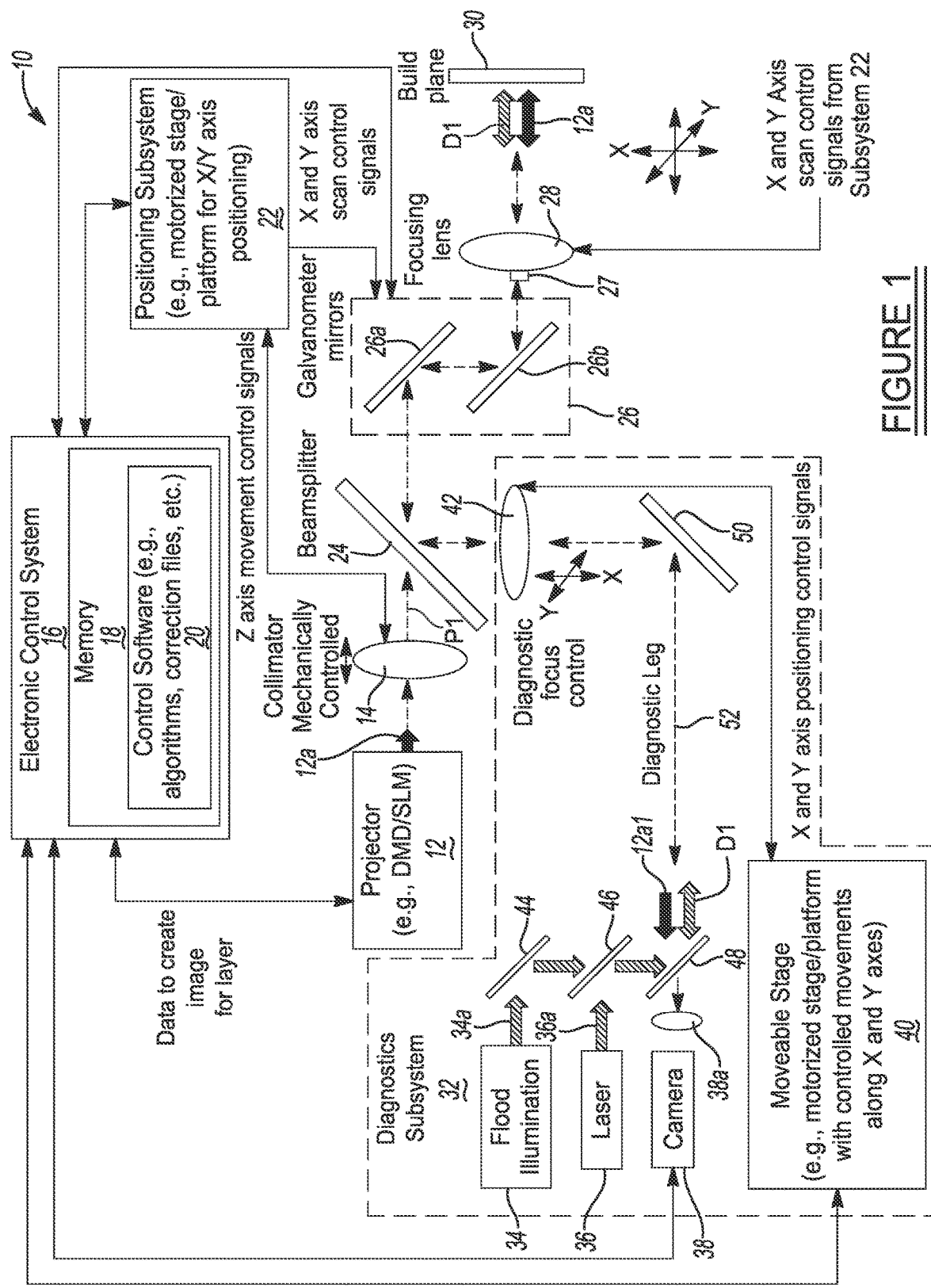
FIG. 1 is a high level block diagram of one embodiment of a system in accordance with the present disclosure which makes use of dynamic adjustment of a collimator to reduce or eliminate the need for a flat image plane at the build plane.

FIG. 1 shows a system 10 in accordance with one embodiment of the present disclosure. The system 10 in this example provides dynamic control of the positioning of an optical element 14, in this example a collimator (hereinafter simply "collimator 14"), to eliminate the need for a corrected focus plane. The system 10 may include a light projector 12, for example a digital micromirror device ("DMD"), a spatial light modulator ("SLM") system, or any other suitable subsystem for projecting a patterned UV light image 12a (hereinafter simply "optical signal 12a"). The optical signal 12a forms a projected light pattern that is in a wavelength band able to initiate polymerizing, with sufficient power (mW/cm$^2$) and sufficient flux (mJ/cm$^2$) to bring about polymerization. The optical signal 12a may be pulsed, continuous, incoherent or coherent.

The wavelength of the optical signal 12a may vary and can be within a range suitable for initiating polymerization of the photoresist being used. In one implementation the wavelength of the optical signal 12a is selected to be about 405 nm. Other common wavelengths that may be used for photopolymerizable 3D printing are, for example and without limitation, 305 nm, 352 nm, 365 nm, 375 nm, 385 nm, 405 nm, 450 nm, 460 nm, and 470 nm. These wavelengths are the generic center band of common light sources used. If they are generated by LED light sources, they will typically have a bandwidth of about 20 nm to about 40 nm. The choice of light to be used is dependent on the resin requirements, and possibly other factors relating to a specific application. These above-mentioned wavelengths span a 310 nm to 570 nm wavelength range, although still further wavelengths outside of this range may possibly be used depending on the needs of a specific application.

The light projector 12 may be controlled by a processor-based electronic control system 16. The electronic control system 16 may include a memory 18 (e.g., non-volatile, RAM, ROM, etc.) for containing control software 20. The control software 20 may include algorithms, correction files, look-up tables and other data or files used for controlling the manufacturing operation being carried out with the system 10. Information collected during a manufacturing operation, as well as calibration information collected prior to using the system 10 to carry out a manufacturing operation, may also be stored in the memory 18, as will be explained further in the following paragraphs.

The system 10 in the example of FIG. 1 may further include a positioning subsystem 22 such as a motorized stage or platform having motors (e.g., DC stepper motors) or other devices for providing highly controlled incremental movement of the collimator 14, and/or of a galvanometer subsystem 26 and/or a pupil 27 and/or a focusing lens 28 along each of X, Y and Z axes. The positioning subsystem 22 may be controlled by the electronic control system 18 or, optionally, it may include its own controller which communicates (either via a wired connection or wirelessly) with the electronic control system 16.

The system further may include a beamsplitter 24 disposed on a downstream side of the projector 12 for passing a portion of an optical signal 12a emitted from the projector toward the galvanometer subsystem 26. The galvanometer subsystem 26 includes a pair of mirrors 26a and 26b for scanning the optical signal 12a in the X and Y planes. The scanned optical signal 12a is directed through the aperture stop (i.e., pupil) 27 and to the focusing lens 28. In this example the focusing lens 28 is operating similar to an f-theta lens, even though the focusing lens 28 is not a flat field lens. The aperture stop 27 may be a small plate with an aperture of a desired diameter, in one example, a 45-mm diameter aperture or thereabouts, formed at an axial center of the plate. However, in practice the aperture stop can be any practical size or shape from a few mms to 100's of mm in diameter. The size of the aperture is limited by practical sizes of the scanning mirrors and optics being used. Accordingly, it will be appreciated that the aperture size used with the aperture stop 27 may vary significantly according to the needs of a specific implementation. One or more of the collimator 14, the galvanometer subsystem 26, the aperture stop 27 and the focusing lens 28 may be viewed broadly as an optics subsystem for collimating and focusing the optical signal 12a.

The focusing lens 28 focuses the optical signal 12a received from the galvanometer subsystem 26 onto a build plane 30. The build plane 30 may be understood as that surface where an upper surface of a photopolymerizable material is present, which is typically contained within a reservoir or container. In this regard it will be appreciated that the build plane 30, in actual practice, will be disposed in a horizontal plane, but for the purpose of explanation, FIG. 1 shows the build plane 30 and the various components of the system 10 arranged in a horizontally laid out fashion to help understand operation of the system and the explanation of the various components of the system 10. The optical signal 12a is the optical signal used to activate selected portions of a layer of the photopolymerizable resin to cure the desired sections of the exposed photopolymerizable resin, which as mentioned earlier reside within the build plane, as is well understood in scanning projection stereolithography systems.

Stereolithography may also be performed in a bottom-up fashion, where the photopolymerizing light is projected through an optically transparent substrate up into the bottom of a vat of photopolymerizable material. All of the aforementioned techniques for achieving optimized focus in a "top down" method apply to the bottom up method.

The system 10 may further include a diagnostics subsystem 32 for monitoring the optical signal 12a at the build plane 30 and/or controlling focusing of the optical signal 12a through highly controlled movements of the collimator 14. The diagnostics subsystem 32 may include a flood illumination light source 34 for generating an optical flood illumination signal to illuminate some of or all of the build plane 30, an optical signal generating system 36, for example a laser (hereinafter simply "laser 36"), for generating a laser optical signal 36a, and a camera 38 having an associated lens 38a. The diagnostics subsystem 32 may also include a moveable stage or actuated optical elements (e.g., motorized stage or platform) 40 for moving a diagnostic focus control lens 42 along X and Y axes, in real time, to maintain the optical signals 34a and 36a focused on a specific location on the build plane 30. Mirrors or gratings 44, 46 and 48 may also form a portion of the diagnostics subsystem 32 to help direct a flood illumination optical signal 34a (using mirror 44) and a laser diagnostic optical signal 36a (using mirror 46) out toward the beamsplitter 24.

Signals 34a and 36a can be combined to form diagnostic optical signal D1 which is reflected using a mirror 50 of the diagnostics subsystem 32 toward the diagnostic optical focusing element lens 42. From there the diagnostic optical signal D1 is reflected by the beamsplitter 24 to the galvanometer system 26 where it is steered onto the build plane 30 along with the polymerizing optical signal 12a. The diagnostic optical signal D1 is reflected from the build plane 30 along with a portion of the polymerizing optical signal 12a, which has been labelled 12a1 in FIG. 1, back to the diagnostics subsystem 32 where it is imaged by the camera 38. The camera 38 may provide digital information representing the image at the build plane 30 to the electronic controller for analysis, in real time, as will be described in the following paragraphs. The laser optical signal 36a is useful during a pre-operating calibration procedure to help determine the optimal X/Y location that the diagnostic focus control mirror 42 needs to be positioned at to maintain optimum focus at the various X/Y locations on the build plane 30. This feature will be discussed further in the following paragraphs.

The system 10 as shown in FIG. 1 thus provides two distinct optical paths: a first optical labelled P1 along which the optical signal 12a from the light projector 12a travels to the build plane 30, and a second optical path, labelled with reference number 52, by which a small reflected portion of the optical signal 12a, that being portion 12a1, travels back to the diagnostics subsystem 32. The optical path 52 partially overlaps the path P1, but this does not affect system operation in any way.

The flood illumination source 34 provides an optical signal outside of the wavelength that would cause polymerization of the photoresist material being used. The selected wavelength for the flood illumination signal 34a in one implementation is about 630 nm (i.e., well above a wavelength of 405 nm, which will cause polymerization of the photoresist material). It will be appreciated that the specific wavelength used to illuminate the build area for monitoring purposes needs to be outside the photopolymerizable resin's activation band. For many common UV activated resins, a 630 nm LED is well outside the wavelength range. Also, 800 nm is another common LED range which is well outside of activation wavelength. So, for example, a system running at 365 nm for photopolymerization could use a flood illumination signal with a wavelength of 630 nm, or optionally a flood illumination signal with a wavelength of 800 nm.

The laser 36 has a wavelength outside of the photopolymerizing band which can be in one implementation, for example about 630 nm. In one implementation it is fiber coupled into a single mode fiber. The fiber output is focused via optics to the plane of the 405 nm polymerizing light. In this way the laser spot best focus position is used to locate the photopolymerizing plane of best focus with the laser's non-polymerizing wavelength.

The diagnostic focus control lens 42 is moved using the moveable stage 40 to image the spot at which the optical signal 12a is illuminating on the build plane 30. The optical laser signal 36a is used to establish a reference point at a known Z-axis location for the build plane 30 during a calibration operation. This Z-axis location may be stored in the memory 18 for use by the control software 20. By using the diagnostic focus lens 42 to image the spot on the build plane 30 where the optical signal 12a is acting, the laser 36 provides a focus check to help determine exactly where the collimator 14 will be moved to (i.e., what Z axis location relative to the build plane 30) to maintain optimal focus of the polymerizing optical signal 12a as it impinges the build plane 30. To this end a lookup-table may be created during calibration and testing of the system 10, and stored in the memory 18 for use by the electronic control system 10 and the software control module 20 during real time use of the system 10. The look-up table may be a table of Z-axis position values for the collimator 14 (and optionally for the diagnostic focus control lens 42) for when the polymerizing optical signal 12a is scanned to all X/Y points in the build plane 30, for the collimator to achieve optimal focus of the optical signal 12a at each specific X/Y location on the build plane 30.

A unique feature of the system 10 is the placement of the aperture stop 27 on the scan lens side (i.e., "downstream") of the galvanometer system 26. This presents a consistent pupil position for the focusing lens 28, which makes the focusing lens 28 significantly easier to design and significantly improves performance. When the aperture stop 27 is positioned "upstream" of the galvanometer mirrors 26a and 26b, the pupil presented to the focusing lens 28 (or to an f-theta lens) is slewed about as the galvanometer mirrors 26a and 26b scan along the X and Y axes. This makes the focusing lens 28 much more difficult to design and generally results in poorer performance. One consequence of putting the aperture stop 27 on the downstream side of the galvanometer system 26, however, is that the collimator 14 can supply a slightly larger polymerizing optical beam 12a diameter in order to accommodate all field angles without vignetting. However, the collimator 14 design is much easier determined than the focusing lens 28 design (or an f-theta lens design) because the field that the collimator relays is small (i.e., about the same as the light projector 12 field (e.g., DMD field), where the DMD is typically on the order of only 1 cm×1 cm or so. In short, moving the aperture stop 27 to the downstream side of the galvanometer mirrors 26a and 26b more equitably divides the design burden between the collimator 14 and the focusing lens 28 portions of the overall system 10 design. A further consequence of this configuration is that a portion of the UV polymerizing optical signal 12a light from the light projector 12 is discarded because the pupil (i.e., the aperture of the aperture stop 27) is actually being slightly overfilled with light. However, this is a minimal drawback in view of the aforementioned significant advantage in being able to dramatically improve the design of the focusing lens 28 and improve the resolution of the system 10 overall.

Related to having the aperture stop 27 on the downstream side of the galvanometer system 26, it will be appreciated that galvanometer mirror sets are typically labeled with an entrance side and an exit side. The galvanometer mirror on the exit side (this would be mirror 26b in FIG. 1) would typically be slightly larger than that on the entrance side (i.e., the galvanometer mirror 26a in FIG. 1) in order to accommodate the slewing of the optical beam by the first galvanometer mirror. With the aperture stop 27 placed on the downstream side of the galvanometer system 26, it became advantageous to use the galvanometer system 26 "backwards" from the "normal" usage (i.e., larger galvanometer mirror 26a on the side next to collimator 14). If the galvanometer mirror set 26a and 26b were not used "backwards", either a much smaller aperture in the system 10 would be used or the aperture stop 27 would be placed on the collimator 14 side of the galvanometer system 26, which would have made the focusing lens 28 design more challenging, as noted above.

It will be appreciated that a "tessellated" system, such as system 10, involves scanning over the build plane 30 with many high-resolution image projections generated by the light projector 12. These many image projections are scanned in a mosaic pattern or "tessellated" to form a much larger image that is the aggregate of the many individual images. The best image for any location can be mapped to the build space, both in terms of X and Y spatial location; where the image is desired to be projected to in mm (millimeters), and the correct Z axis spatial location of focus positioning for the collimator 14 and/or focusing lens 28 noted for each X/Y location on the build plane 30. So during a calibration process, this may be mapped with the camera 38 which is moved (either manually or via a separate motorized stage), so that the camera is focused to the correct/desired Z axis location, typically in the center of the build area. As the collimator 14 is actively adjusted, the collimator location along the Z axis and the positions of the X and Y galvanometer mirror pairs (i.e., elements 26a and 26b) are recorded. The image quality is assessed via projection of various patterns including line pair measurement for MTF (modulation transfer function). The camera 38 is now translated either by automatic means or manually over the entire area of the build plane 30. In this way the correct voltage to the X, Y, galvanometer mirrors 26a and 26b along with the collimator 14 and/or focusing lens 28 Z axis focus position (in mm) are recorded for the desired X/Y position in the build plane 30. This allows the generation of a correction file, for example in the form of the look-up table mentioned above, for the system 10 to use during its operation. Distortions and/or idiosyncrasies of the system are therefore mapped and corrected. In this way correction files are measured, recorded, and then utilized to achieve the best performance of the system 10 (i.e., the best focus of the polymerizing optical signal 12a at each X/Y location on the build plane 30, and pre-corrections can be applied to the model of the 3D object to be printed).

The above described technique may also be used to setup and qualify the diagnostic leg section 52 of the system 10. The camera 38 is focused across the field, either with a camera target on the stage, or by focusing on a static target that covers the entire build plane 30 area. In this manner, specific X/Y locations for the diagnostic focus control mirror 42 may be recorded when the diagnostic optical signal D1 is determined to be at given X/Y locations on the build plane.

The system 10, which in the described embodiments forms a large area projection micro-stereo lithography (LA-PuSL) system, may further be considered as incorporating two distinct subsystems: a projection section or projection leg to project/image the polymerizing optical signal 12a light onto the build plane 30 where the polymerization occurs, and the diagnostic section (diagnostics subsystem 32) or "diagnostic leg" which images the build plane 30 partially along the same beam path as the polymerization optics. This may be viewed as "co-linear diagnostics". As the diagnostics are co-linear, i.e., they occur and travel on the same beam path as the projection optics that they view, diagnose and image, all the way to the projection build plane 30, it can be said that they effectively "ride along" with the projection polymerizing optical signal 12a. This enables monitoring of the build plane 30 simultaneously with the projecting of the polymerizing optical signal 12a onto the build plane.

The diagnostic leg 52 in FIG. 1 is typically connected to the projection leg P1 via some optic, such as beamsplitter 24 shown in FIG. 1, or optionally by a dichroic mirror or other suitable element. However, the system 10 is not limited to the use of such a coupling optic positioned upstream of the scanning mechanism. Similarly, the system 10 is not necessarily limited to the use of a galvanometer scanning mirror pair, and other optical scanning subsystems such as a scanning polygonal mirror system, Risley prism pairs, acousto-optic or electro-optic modulation systems may also be used. An advantage of the system 10 described herein, however, is that the diagnostic leg 52 and the projection leg P1 are co-linear and experience the same angular deflection from the galvanometer system 26 scanner, and pass through the focusing optics while travelling to the same X/Y position on the build plane 30. This feature enables light from the build plane 30 which is created from scatter, reflection, fluorescence, or any other mechanism, to now be viewed by the camera 38 of the diagnostics subsystem 32.

The diagnostic leg 52 can be utilized both actively and passively to assist with set up of the system 10 for normal print run, to view and monitor in real time the build plane 30 while a print run is occurring, and to view or diagnose aspects of the print or system 10 performance after a print run is completed. The separation of diagnostics features of the system 10 into "active" and "passive" operation may be further understood and appreciated with specific examples. One example of active diagnostics is actively controlling the focus of the diagnostics to view different focus positions or to compensate for different wavelengths. Another example is projecting a second wavelength optical flood signal to flood illuminate the build plane 30 with non-polymerizing light. This light reflecting off the build plane 30 can be viewed by the camera 38, but is not limited to being viewed by just a camera system. However, if a camera or other suitable imaging device is used, it can then resolve with high fidelity the build plane 30 in this second wavelength band. Still another example is projecting a second wavelength optical signal to induce fluorescence of parts in the build plane 30. The fluoresced light from the build plane 30 may then be viewed by, for example and without limitation, a camera system, which can then resolve with high fidelity the fluorescence from the build plane 30. Still another example is viewing the fluorescence induced by the polymerizing light (i.e., by the polymerizing optical signal 12a). Still another example is using a laser which projects a beam of light to a small spot, and which is adjusted to be focused on the build plane to act as a fiducial to locate the correct build plane position. This can be done both for initial setup/calibration of the system 10 and during a build process. Still another example is viewing the polymerizing light from the projection leg 52 with the co-linear camera 38 both in initial setup and during the build process when making a part.

Examples of passive diagnostic applications are many as well. For one, the camera 38 may be set to image the build area 30 with high fidelity. This can then be used to set the initial position of the build substrate to the build plane 30, view the build in progress, or view the part in the build area with the aforementioned flood illuminated light. Another example of passive diagnostics is viewing the laser spot for focus, viewing, and monitoring for fluorescence. In these examples the camera 38 is integral and important to the diagnostics and the overall setup of the system 10. Still another example of passive diagnostics is that more than one camera can be used, for example to image optical signals at different wavelengths. Still further, filters of various kinds can be employed actively or permanently to enhance viewing different aspects of the image created at the build plane 30. For example, the flood illumination can be on at the same time as the polymerizing light, but the flood illuminated light may be overwhelmed by the high intensity polymerizing light and may not be distinguishable in the camera image. To accommodate this a filter can be actively positioned in the camera to block the polymerizing light, thereby allowing only the flood illumination light on the build plane 30 to be viewed by the camera.

The present system 10 is thus able to determine and store an optimal focus position (i.e., the optimal optical configuration) for every X/Y position on the build plane 30. The optimal focus position can be measured in advance and stored, for example, in a look-up table, a spreadsheet or other form of data file. The system 10, as explained above, is able to monitor the build process using the real time diagnostics and adjust the focus position on the fly when needed. However, this real time focus position adjustment capability will not necessarily be needed for all applications of the system 10, but the system 10 nevertheless provides it, and it is expected that such real time adjustment capability will still be advantageous and/or needed in some applications.

It will also be understood that determining and selecting the optimal focus position for any X/Y position on the build plane 30 can be generally thought of as determining and selecting the highest contrast image position at each specific X/Y position on the build plane. This is important, and a principal feature of the system 10. It will be appreciated that normally a projected image needs to be good (i.e., have sharp focus) over its entire projected area, for example like an image projected on a large screen at a movie theater, where the entire image is projected at once. This involves compromises with the optical image quality, so all areas of the image will be projected with a sharpness/focus which are "good enough". For the movie theater example above, this is sufficient, as a patron cannot resolve any difference or deficiencies in focus/sharpness at different X/Y locations of the image being projected on the screen. However, if one desires the highest resolution (i.e., near diffraction limited) over a very large area, then this becomes very difficult and expensive to achieve.

The system 10 and its optics as described above ensures that the best image is produced over the entire X/Y area of the build plane 30, with little or no concern for the focus position. Normally, focus is typically the first feature or quality that one prioritizes in an optical system. However, if one ignores it, and instead makes the best image, regardless of the focus, then one does not have to compromise, and a much better image can be produced over a large area. The system 10 achieves this by effectively "breaking up" a large projected layer into many distinct, smaller area projections. In contrast, for the theater example, it is not possible to adjust different parts of the image being projected on the screen differently; rather, all areas of the image need to be adjusted in a single operation at one time. The system 10 eliminates this restriction, enabling focus to be adjusted for different X/Y locations over the entire area where the image is being projected. Each of these smaller projections at distinct X/Y locations becomes an opportunity to optimize the quality of the overall image by adjusting the focus as needed at each X/Y location on the build plane 30.

As a result, the system 10 and its optics provide dramatically enhanced image resolution over an entirety of a large projected area (e.g., an entire build plane) than what would be achievable with typical prior art systems that do have the dynamic adjustment capabilities that the system 10 provides. Prior art systems do not provide this capability, as prior art systems are not capable of projecting "sub-images" for different distinct X/Y locations on a build plane, and then connecting them together, like a mosaic, into a much larger pattern. The system 10 thus is able to provide a high resolution over a large area, where focusing is optimized at all X/Y locations of the overall image.

Figure 2:
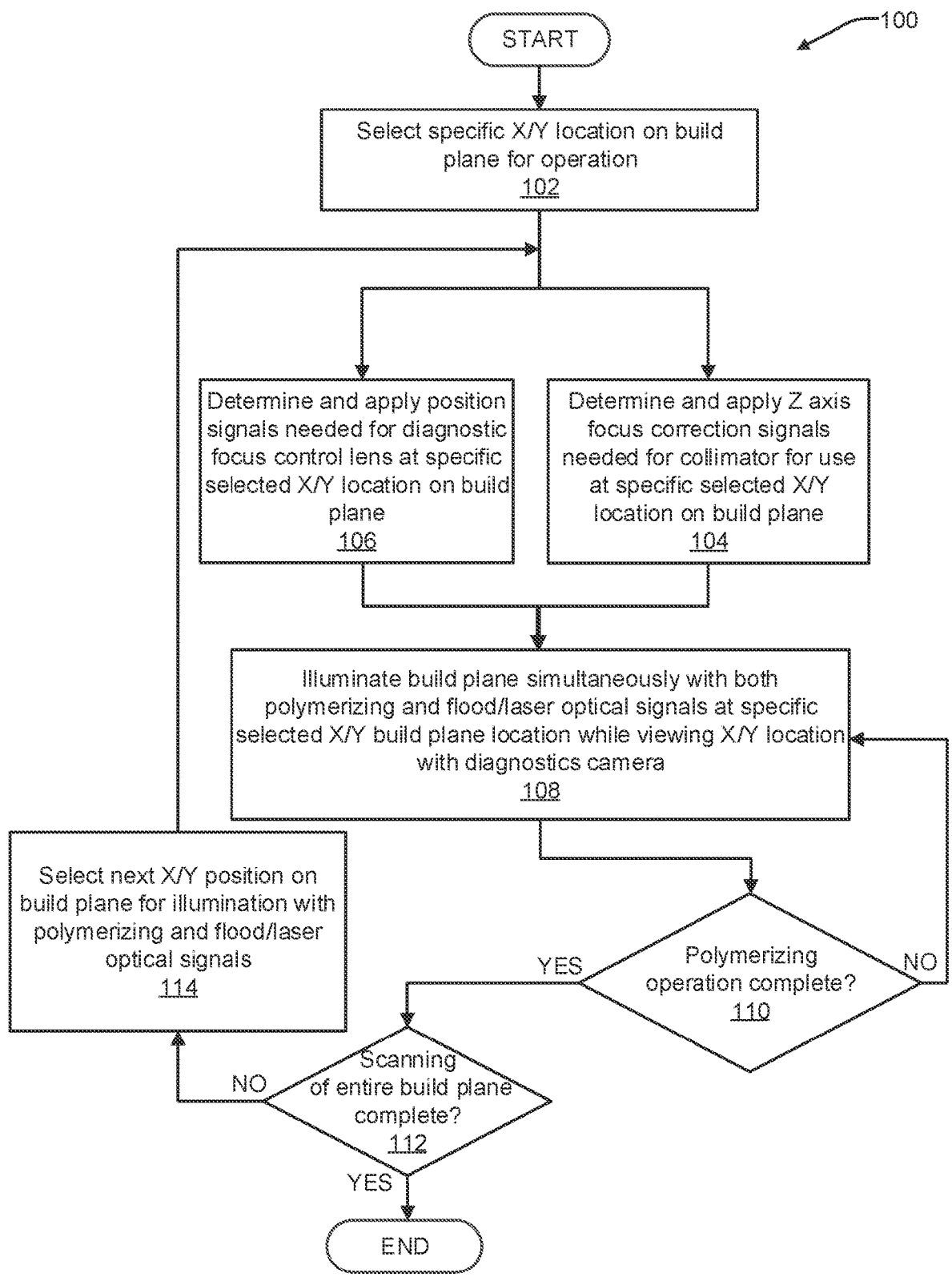
FIG. 2 is a high level flowchart of operations that may be performed using the system shown in FIG. 1.

Referring to FIG. 2, a flowchart 100 is illustrated which shows major operations that may be performed using the system 10. At operation 102 a specific X/Y location on the build plane 30 is selected for operation (selection typically being made by the electronic control system 16). At operation 104 the Z axis focus correction position signals for the collimator 14 are determined and applied by the positioning subsystem 22 to position the collimator and/or the focusing lens along the Z axis to achieve the best focus at the current X/Y location. Simultaneously (or substantially simultaneously, or subsequently, or possibly even prior to operation 104) the position signals used for positioning the diagnostic focus control lens 42 are determined and applied at operation 106 to position the diagnostic focus control lens 42 to view the polymerizing action that will occur at the selected X/Y location on the build plane 30. At operation 108 the build plane 30 is illuminated either simultaneously or substantially simultaneously with both the polymerizing optical signal 12a and the diagnostic optical signal D1, while using the camera 38 to view the action occurring at the X/Y location on the build plane 30. In this example this viewing/monitoring action using the camera 38 occurs in real time, but it need not be in performed in real time. At operation 110 a check is made to determine if the polymerizing action is complete. If the answer to this check is "No", then operation 108 continues. If the check at operation 110 produces a "Yes" answer, then a check is made to determine if scanning for the entire build plane 30 is complete. If this check produces a "No" answer, then the next X/Y location on the build plane is selected for operation, as indicated at operation 114, and operations 104-112 are repeated. If the check at operation 112 indicates that scanning of the build plane 30 is complete, then operation concludes for that specific layer of the part being manufactured using the system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

RECITATION OF VARIOUS EMBODIMENTS OF THE PRESENT DISCLOSURE

Embodiment 1: A system for performing scanning projection stereolithography, the system comprising: a light projector configured to generate a polymerizing optical signal to initiate polymerization of a photopolymerizable resin or material at a build plane; an optics subsystem for collimating and focusing the polymerizing optical signal, the optics subsystem being movable relative to the build plane to optimize focus of the polymerizing optical signal at the build plane; a light scanning subsystem configured to direct the polymerizing optical signal received from the optics subsystem to selected X axis and Y axis locations on the build plane; and a positioning subsystem for positioning the optics subsystem at a selected location relative to the build plane, where the selected location is chosen to optimize focusing of the polymerizing optical signal at a specific, selected X/Y location on the build plane.

Embodiment 2: The system of claim 1, wherein the optics subsystem comprises a collimator.

Embodiment 3: The system of claim 1, wherein the optics subsystem comprises a focusing lens.

Embodiment 4: The system of claim 1, wherein the optics subsystem comprises a collimator and a focusing lens.

Embodiment 5: The system of claim 1, wherein the optics subsystem includes a focusing lens, and wherein the focusing lens is disposed downstream of the light scanning subsystem and upstream of the build plane, relative to a direction of travel of the polymerizing optical signal, for focusing the polymerizing optical signal at the specific, selected X axis and Y axis location on the build plane.

Embodiment 6: The system of any one of claims 1-5, further comprising a diagnostics subsystem configured to optically monitor a polymerizing action occurring at the selected X axis and Y axis location on the build plane.

Embodiment 7: The system of any one of claims 1-5, further comprising an optical component disposed in a path of the polymerizing optical signal for enabling passage of the polymerizing signal therethrough; and a diagnostics subsystem configured to optically monitor a polymerizing action occurring at the selected X axis and Y axis location on the build plane by receiving a portion of the polymerizing optical signal reflected from the optical component; wherein the optical component enables a reflected portion of the polymerizing optical signal reflected from the build plane to be re-directed therethrough to the diagnostics subsystem.

Embodiment 8: The system of either of claim 6 or 7, wherein the diagnostics subsystem includes one or more cameras for imaging an optical signal returning from the build plane to view polymerization occurring at the build plane while forming a part.

Embodiment 9: The system of any one of claim 6, 7 or 8, wherein the diagnostics subsystem further includes a flood illumination source for producing an optical flood illumination signal which is channeled through the optical components, and scanned by the light scanning subsystem to the build plane, for flooding the build plane with flood illumination light, the flood illumination light being unable to initiate polymerization of the photopolymerizable resin at the build plane.

Embodiment 10: The system of any one of claims 6-9, wherein the diagnostics subsystem further includes a laser configured to provide a laser optical signal directed onto the build plane, to assist in determining a reference location for the build plane.

Embodiment 11: The system of claim 10, wherein the optical flood illumination signal and the laser optical signal are combined to form a diagnostic optical signal; and the diagnostics subsystem further includes a diagnostic focus control lens for receiving the diagnostic optical signal from the diagnostics subsystem, and directing the diagnostic optical signal to the diagnostic focus control lens, the diagnostic focus lens further configured to direct the diagnostic optical signal to the optical component, and the optical component redirecting the diagnostic optical signal to the light scanning subsystem, which in turn scans the diagnostic optical signal onto the build plane at the same X axis and Y axis location that the polymerizing optical signal is being directed at.

Embodiment 12: The system of claim 11, wherein the diagnostics subsystem further comprises at least one of a moveable stage or a motorized optical assembly for controllably positioning the diagnostic focus control lens such that the diagnostic optical signal is directed by the optical component into an optical path being travelled by the polymerizing optical signal.

Embodiment 13: The system of any one of claims 1-12, wherein the light scanning subsystem comprises a galvanometer subsystem.

Embodiment 14: The system of claim 13, wherein the galvanometer subsystem comprises first and second scanning mirrors arranged to scan the polymerizing optical signal along X and Y axes to the specific, selected X axis and Y axis locations on the build plane.

Embodiment 15: The system of claim 10, wherein the optical flood illumination signal comprises a first optical signal having a wavelength outside of a band of wavelengths capable of causing polymerization of the photopolymerizable resin or material; and the laser optical signal comprises a second optical signal having a wavelength outside of a band of wavelengths capable of causing polymerization of the photopolymerizable resin or material.

Embodiment 16: The system of any one claims 1-15, wherein the light projector comprises at least one of a spatial light modulator or a digital micromirror device.

Embodiment 17: The system of claim 5, further comprising an aperture stop component disposed between the light scanning subsystem and the focusing lens, to define a diameter of the polymerizing optical signal that is projected onto the build plane.

Embodiment 18: A system for performing scanning projection stereolithography, the system comprising a light projector configured to generate a polymerizing optical signal to initiate polymerization of a photoresist material at a build plane; a collimator for collimating the polymerizing optical signal and a focusing lens system for focusing the polymerizing optical signal, at least one of the collimator or the focusing lens system being adjustable by movement along an axis relative to the build plane to optimize focus of the polymerizing optical signal at the build plane; a light scanning subsystem configured to direct the polymerizing optical signal received from the collimator and the focusing lens system to selected X axis and Y axis locations on the build plane; a focusing lens disposed downstream of the light scanning subsystem and upstream of the build plane, relative to a direction of travel of the polymerizing optical signal from the light projector, for focusing the polymerizing optical signal at a selected X axis location and Y axis location on the build plane; a positioning subsystem for positioning at least one of the collimator or the focusing lens at a selected location along the Z axis, where the selected location is chosen to optimize focusing of the polymerizing optical signal at the specific, selected X axis location and Y axis location on the build plane; and a diagnostics subsystem including a camera for imaging a portion of the polymerizing optical signal reflected from the build plane to view polymerization occurring at the build plane while forming a part.

Embodiment 19: The system of claim 18, wherein the focusing lens is translated to locate a position of optimum focus/performance of the system, and wherein the optimum focus/performance is represented by a maximum contrast image position at each specific X axis and Y axis location on the build plane.

Embodiment 20: The system of either of claim 18 or 19, further comprising a signal splitting element for passing the polymerizing optical signal therethrough as the polymerizing optical signal travels toward the build plane along a first optical path in a first direction, and for reflecting a portion of the polymerizing optical signal in a second direction opposite to the first direction, and toward the camera of the diagnostics subsystem.

Embodiment 21: The system of any one of claims 18-20, wherein the diagnostics subsystem includes: a laser for generating a laser optical signal; a diagnostic focus control lens for steering the laser optical signal onto the signal splitting element such that the laser optical signal can be steered by the light scanning subsystem towards and onto the build plane; and a moveable stage for moving the diagnostic focus control lens to assist in aiming the laser optical signal at the signal splitting element.

Embodiment 22: The system of any one of claims 18-21, wherein the diagnostics subsystem further includes: a flood illumination source for generating a flood illumination optical signal, the flood illumination signal being steered by the diagnostic focusing lens toward the signal splitting element, wherein the signal splitting element reflects the flood illumination optical signal toward the light scanning subsystem to be subsequently scanned onto the build plane.

Embodiment 23: A method for performing scanning projection stereolithography, the method comprising projecting a polymerizing optical signal toward a build plane, wherein the polymerizing optical signal is able to initiate polymerization of a photopolymerizable resin or material located at the build plane; scanning the polymerizing optical signal to selected X and Y axis locations on the build plane; collimating and focusing the polymerizing optical signal prior to the polymerizing optical signal reaching the light scanning subsystem; adjusting a position of the optics subsystem before the polymerizing optical signal reaches the light scanning subsystem; and optimizing a focus of the polymerizing optical signal when the polymerizing optical signal reaches a specific X axis and Y axis location on the build plane.

Embodiment 24: The method of claim 23, wherein collimating or focusing comprises using at least one of a collimator or a focusing lens.

Embodiment 25: The method of either of claim 23 or 24, further comprising monitoring operation of the polymerizing optical signal at the build plane.

Embodiment 26: The method of claim 25, wherein the monitoring of operation of the polymerizing optical signal at the build plane comprises using a diagnostic subsystem to monitor operation of the polymerizing optical signal at the build plane in real time.

What is claimed is:

1. A system for performing scanning projection stereolithography to use a plurality of independent image projections to create a tessellated image for each layer of a 3D part being formed, the system comprising:
    an optics subsystem having a collimator;
    a build plane forming an upper surface of a layer of photopolymerizable resin;
    an electronic controller having a memory;
    the memory including a correction/calibration file including a plurality of Z-axis position values for the collimator for when a polymerizing optical signal is scanned to a plurality of different X/Y axis locations in the build plane, for the collimator to achieve optimal focus of an optical signal at the build plane for each specific one of said X/Y locations;
    a light projector configured to generate the polymerizing optical signal to initiate polymerization of the layer of photopolymerizable resin residing on the build plane;
    the optics subsystem configured to collimate and focus the polymerizing optical signal, the optics subsystem being movable along a Z axis and positionable at different predetermined Z axis positions, relative to the upper surface of the build plane, and in accordance with information in the correction/calibration file that optimizes a Z axis focus of the polymerizing optical signal at each one of a predetermined plurality of differing X axis and Y axis locations on the build plane, relative to the upper surface of the build plane, and wherein the Z axis is normal to each of the X and Y axes, and each one of the predetermined Z axis positions corresponds to a specific one of a plurality of different X axis and Y axis locations on the build plane, and wherein the predetermined Z axis positions are stored together with their corresponding X and Y axis locations in the correction/calibration file;
    a light scanning subsystem configured to direct the polymerizing optical signal received from the optics subsystem to selected X axis and Y axis locations on the build plane as a plurality of individual image projections in one of a mosaic pattern or tessellated to form a larger image that is an aggregate of the plurality of individual image projections; and
    a positioning subsystem configured to access the correction/calibration file in the memory and to obtain specific ones of the Z axis positions corresponding to the X axis and Y axis locations on the surface to be printed, and to position the optics subsystem at selected ones of the predetermined Z axis positions which correspond to the X axis and Y axis locations on the upper surface of the build plane being printed, to create ones of the plurality of independent image projections used to construct the tessellated image at the surface of the build plane, while cancelling out distortions and idiosyncrasies of the system.

2. The system of claim 1, wherein the optics subsystem comprises a focusing lens.

3. The system of claim 1, wherein the optics subsystem further comprises a focusing lens, and at least one of the collimator or the focusing lens is moved along the Z axis to optimize focus at each said X axis and Y axis location being printed.

4. The system of claim 1, wherein the optics subsystem includes a focusing lens, and wherein the focusing lens is disposed downstream of the light scanning subsystem and upstream of the build plane, relative to a direction of travel of the polymerizing optical signal, for focusing the polymerizing optical signal at the specific, selected X axis and Y axis location on the build plane.

5. The system of claim 1, further comprising a diagnostics subsystem configured to optically monitor a polymerizing action occurring at each one of the selected X axis and Y axis locations on the build plane being printed.

6. The system of claim 1, further comprising:
    an optical component disposed in a path of the polymerizing optical signal for enabling passage of the polymerizing signal therethrough; and
    a diagnostics subsystem configured to optically monitor a polymerizing action occurring at each said selected X axis and Y axis location on the build plane by receiving a portion of the polymerizing optical signal reflected from the optical component;
    wherein the optical component enables a reflected portion of the polymerizing optical signal reflected from the build plane to be re-directed therethrough to the diagnostics subsystem.

7. The system of claim 6, wherein the diagnostics subsystem includes one or more cameras for imaging an optical signal returning from the build plane to view polymerization occurring at the build plane while forming a part.

8. The system of claim 7, wherein the diagnostics subsystem further includes a flood illumination source for producing an optical flood illumination signal which is channeled through the optical components, and scanned by the light scanning subsystem to the build plane, for flooding the build plane with flood illumination light, the flood illumination light being unable to initiate polymerization of the photopolymerizable resin at the build plane.

9. The system of claim 8, wherein the diagnostics subsystem further includes a laser configured to provide a laser optical signal directed onto the build plane, to assist in determining a reference location for the build plane.

10. The system of claim 9, wherein:
    the optical flood illumination signal and the laser optical signal are combined to form a diagnostic optical signal; and the diagnostics subsystem further includes a diagnostic focus control lens for receiving the diagnostic optical signal from the diagnostics subsystem, and directing the diagnostic optical signal to the diagnostic focus control lens, the diagnostic focus lens further configured to direct the diagnostic optical signal to the optical component, and the optical component redirecting the diagnostic optical signal to the light scanning subsystem, which in turn scans the diagnostic optical signal onto the build plane at the same X axis and Y axis location that the polymerizing optical signal is being directed at.

11. The system of claim 10, wherein the diagnostics subsystem further comprises at least one of a moveable stage or a motorized optical assembly for controllably positioning the diagnostic focus control lens such that the diagnostic optical signal is directed by the optical component into an optical path being travelled by the polymerizing optical signal.

12. The system of claim 1, wherein the light scanning subsystem comprises a galvanometer subsystem.

13. The system of claim 12, wherein the galvanometer subsystem comprises first and second scanning mirrors arranged to scan the polymerizing optical signal along X and Y axes to the specific, selected X axis and Y axis locations on the build plane.

14. The system of claim 9, wherein:
the optical flood illumination signal comprises a first optical signal having a wavelength outside of a band of wavelengths capable of causing polymerization of the photopolymerizable resin or material; and
the laser optical signal comprises a second optical signal having a wavelength outside of a band of wavelengths capable of causing polymerization of the photopolymerizable resin or material.

15. The system of claim 1, wherein the light projector comprises at least one of:
a spatial light modulator; or
a digital micromirror device.

16. The system of claim 4, further comprising an aperture stop component disposed between the light scanning subsystem and the focusing lens, to define a diameter of the polymerizing optical signal that is projected onto the build plane.

17. A system for performing scanning projection stereolithography and using a plurality of independent image projections to create a tessellated image for each layer of a three-dimensional part being formed, to help create the three-dimensional part, the system comprising:
a build plane forming having an upper surface of a layer of polymerizable resin;
an electronic control system including a memory;
a collimator;
the memory including a correction/calibration file including a plurality of Z-axis position values for the collimator for when a polymerizing optical signal is scanned to a plurality of different X/Y axis locations in the build plane, for the collimator to achieve optimal focus of an optical signal at the upper surface of the build plane for each specific one of said X/Y locations;
a light projector configured to generate the polymerizing optical signal to initiate polymerization of a photoresist material at a build plane;
the collimator configured to collimate the polymerizing optical signal;
a light scanning subsystem configured to direct the polymerizing optical signal received from the collimator to each one of a plurality of predetermined X axis and Y axis locations on the build plane as a plurality of individual image projections in one of a mosaic pattern or as a tessellated image to form a larger image that is an aggregate of the plurality of individual image projections;
a focusing lens disposed downstream of the light scanning subsystem and upstream of the build plane, relative to a direction of travel of the polymerizing optical signal from the light projector, for focusing the polymerizing optical signal successively at each one of the predetermined X axis and Y axis locations on the upper surface of the build plane to create the plurality of independent image projections needed to create the tessellated image on the upper surface of the build plane;
a positioning subsystem for positioning at least one of the collimator or the focusing lens at a selected one of a plurality of differing locations along the Z axis, where each one of the plurality of differing Z axis locations is stored in the correction/calibration file and obtained by the positioning subsystem depending on a specific one of the predetermined X axis and Y axis locations to be printed, the selected one of the plurality of differing Z axis locations being chosen to create one of the plurality of independent image projections having an optimal focus, relative to the upper surface of the build plane, at the specific, selected X axis and Y axis location on the upper surface of the build plane, while cancelling out distortions and idiosyncrasies of the system; and
a diagnostics subsystem including a camera for imaging a portion of the polymerizing optical signal reflected from the build plane to view polymerization occurring at the build plane while forming the part.

18. The system of claim 17, wherein the focusing lens is translated to in accordance with the selected Z axis locations obtained from the correction/calibration file to locate a position of optimum focus/performance of the system, and wherein the optimum focus/performance is represented by a maximum contrast image position at each specific X axis and Y axis location on the build plane.

19. The system of claim 17, further comprising a signal splitting element for passing the polymerizing optical signal therethrough as the polymerizing optical signal travels toward the build plane along a first optical path in a first direction, and for reflecting a portion of the polymerizing optical signal in a second direction opposite to the first direction, and toward the camera of the diagnostics subsystem.

20. The system of claim 19, wherein the diagnostics subsystem includes:
a laser for generating a laser optical signal;
a diagnostic focus control lens for steering the laser optical signal onto the signal splitting element such that the laser optical signal can be steered by the light scanning subsystem towards and onto the build plane; and
a moveable stage for moving the diagnostic focus control lens to assist in aiming the laser optical signal at the signal splitting element.

21. The system of claim 20, wherein the diagnostics subsystem further includes:
a flood illumination source for generating a flood illumination optical signal, the flood illumination signal being steered by the diagnostic focusing lens toward the signal splitting element, wherein the signal splitting element reflects the flood illumination optical signal toward the light scanning subsystem to be subsequently scanned onto the build plane.

\* \* \* \* \*